J. F. Rote,
Ice Cream Freezer.
No. 113,450.   Patented Apr. 4, 1871.
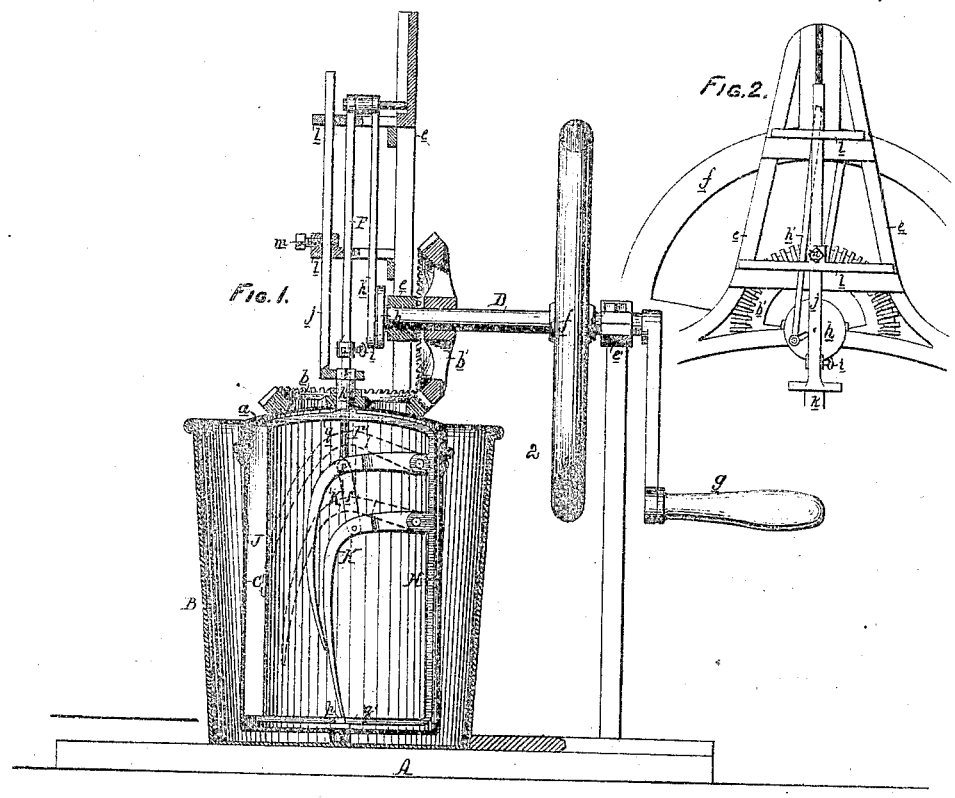
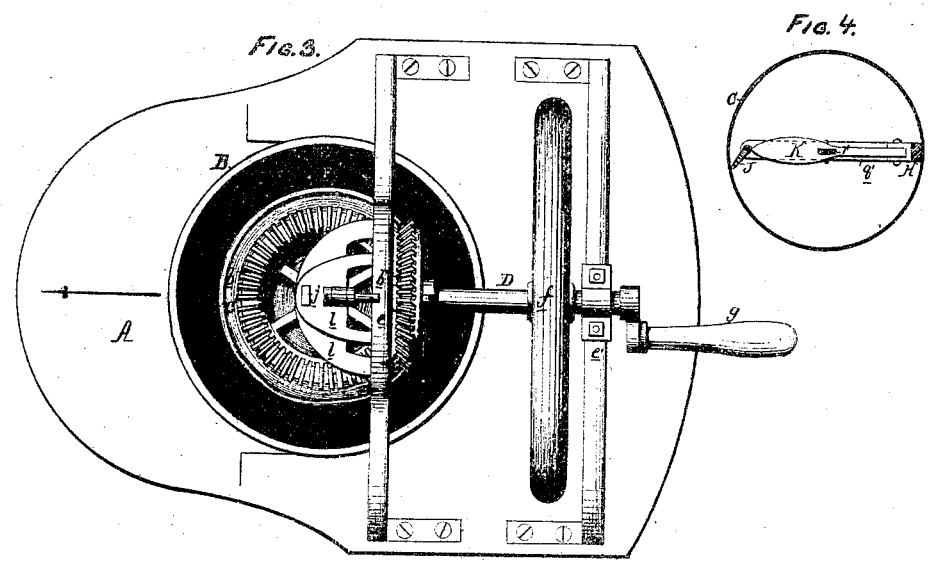
WITNESSES  
Jno. B. Harding  
Thomas McSwain
John F. Rote  
by his Attys  
Stinson & Son

United States Patent Office.

JOHN FRANKLIN ROTE, OF READING, PENNSYLVANIA.

Letters Patent No. 113,450, dated April 4, 1871.

IMPROVEMENT IN ICE-CREAM FREEZERS.

The Schedule referred to in these Letters Patent and making part of the same.

I, JOHN FRANKLIN ROTE, of Reading, county of Berks, State of Pennsylvania, have invented an Improved Ice-Cream Freezer, of which the following is a specification.

Nature and Object of the Invention.

My invention consists of certain curved arms or blades hinged to a fixed bar or frame within the inner revolving vessel of an ice-cream freezer, and having such reciprocating motion imparted to them that they shall be moved both vertically and laterally as the vessel revolves, so as to cause a thorough agitation and circulation of the cream from the sides of the vessel toward the center, and vice versa, all of which is fully described hereafter.

My invention consists further of certain connections, fully described hereafter, which enable the vessel to be readily attached to or detached from the operating mechanism.

Description of the Accompanying Drawing.

Figure 1 is a vertical sectional view of my improved ice-cream freezer;

Figure 2, an exterior view of the upper portion of the same;

Figure 3, a plan view; and

Figure 4, a sectional plan view of the interior vessel on the line 1-2, fig. 1.

General Description.

A represents the base;

B, the outer vessel; and

C, the inner revolving vessel of an ice-cream freezer, these parts being arranged as usual, or in any suitable manner.

The vessel C has a detachable lid, $a$, and the required revolving motion is imparted to it by means of a gear-wheel, $b$, secured to the top of the said lid, and gearing into a similar wheel, $b'$, hung to a horizontal shaft, D, which has its bearings in standards or frames $e$ and $e'$, secured to the base A.

The said shaft is also provided with a fly-wheel, $f$, and has, at one end, a driving-crank or handle, $g$, and at its opposite end a crank or crank-wheel, $h$, which, through the medium of a connecting-rod, $h'$, communicates a vertical reciprocating movement to a guided plunger-rod, formed in two sections, F and F', the former of which has at its lower end a socket and set-screw, $i$, adapted for the reception and retention of the upper end of the section F' of the rod, which extends downward through a hollow stem or sleeve, $k$, into the interior of the revolving vessel C.

The sleeve $k$, which extends through the hub of the cog-wheel $b$ and through the lid $a$ into the interior of the vessel, is prevented from turning with the latter by means of an adjustable sliding rod, $j$, adapted to openings in arms $l\ l$ of the frame $e$, arranged to be held in any position to which it is raised or lowered by a set-screw, $m$, and having at its lower end a square socket adapted to the squared upper end of the said sleeve $k$.

The latter forms a part of or is connected within the vessel C to a metal frame, H, which is also supported at the bottom by a pivot-pin, $p$, and which has arms $q$ and $q'$ extending across the vessel close to the top and bottom of the latter, and having pivoted to their outer ends a vertical blade or scraper, J, which is almost or quite in contact with the side of the vessel, and serves, as the latter revolves, to scrape the particles of frozen cream from the sides of the same.

Two curved arms or blades K K are also hinged to the upper vertical portion of the frame H, and are connected together by a link, $r$, and attached to the lower end of the rod F', so that as the latter is reciprocated the said arms shall also be raised and lowered. These arms are preferably made of a spoon-shape at or near their outer ends, and are so curved that when raised their ends shall be thrown outward toward the scraper J, and inward toward the center of the vessel when lowered.

The freezer is operated by turning the crank $g$, which will cause the vessel C to revolve in the outer or ice-vessel B, and the arms or blades K to be at the same time operated in the manner above-described.

It is important that the whole of the mass of cream within the vessel C should be thoroughly and constantly agitated, and a circulation induced from and toward the sides of the vessel, so that the whole of the mass may be quickly and uniformly frozen, and so that it may be perfectly smooth and free from lumps of frozen cream.

The scraper J answers this purpose in a measure by scraping off and preventing the adhesion of frozen particles to the sides of the vessel; but I have found that where this scraper is used alone the center of the mass remains comparatively undisturbed, so that the product is apt to be lumpy, unless the cover of the vessel be frequently removed to permit the contents to be stirred.

This objection is entirely overcome and a uniform product obtained by the use of the blades K, which, on their downward movement, remove whatever of the frozen particles may have adhered to the scrapers, and carry these particles as well as portions of the mass adjacent to the scraper toward the center of the vessel, whence they are again thrown outward by the revolving motion of the vessel and the upward and outward movement of the blades. In this way the desired thorough and constant agitation of the partially-frozen mass is obtained, and the formation of lumps effectually prevented.

In some cases a single blade, K, may be found sufficient to answer the purpose, while in other instances more than two blades may be used.

The connections between the parts within the vessel C and the operating mechanism above are such as to enable the said parts to be readily detached, and the vessel C as well as the outer vessel B to be removed from the base A by an outward movement of the said vessels in the direction of the arrows, figs. 1 and 3.

All that is required to thus disconnect the parts is to loosen the set-screw and raise the socket $i$ from the end of the rod F', and to also raise the rod $j$ from the squared end of the sleeve $k$, and the parts can be as readily connected after replacing the vessels by lowering the rods F and $j$ and tightening their set-screws.

Claims.

1. A blade or blades, K, hinged to a fixed rod or frame within the inner revolving vessel of an ice-cream freezer, and operated substantially in the manner described, by a reciprocating rod, F', or its equivalent.

2. The combination of the said blade or blades, to which the within-described movements are imparted, with the scraper J.

3. The combination of the freezer, the adjustable rod $j$ connected to the square end of the sleeve $k$, the reciprocating rod F having a socket and set-screw, $i$, and the rod F' operating the blades K, all substantially as specified.

In testimony whereof I have signed my name to this specification in the presence of two subscribing witnesses.

JOHN FRANKLIN ROTE.

Witnesses:
WASHINGTON RICHARDS,
D. D. MANSER.